Sept. 28, 1937. G. H. FRASER 2,094,531
GAS FILTER
Original Filed March 6, 1933 2 Sheets-Sheet 1

INVENTOR:
George Holt Fraser

Sept. 28, 1937. G. H. FRASER 2,094,531
GAS FILTER
Original Filed March 6, 1933   2 Sheets-Sheet 2

INVENTOR :
George Hole Fraser

Patented Sept. 28, 1937

2,094,531

UNITED STATES PATENT OFFICE 2,094,531

GAS FILTER

George Holt Fraser, Brooklyn, N. Y.

Application March 6, 1933, Serial No. 659,813
Renewed December 4, 1936

6 Claims. (Cl. 183—53)

This invention relates to filters for air or other fluids, and aims to improve such devices.

To this end the invention provides various features of improvement, the preferred embodiment of which will be hereinafter more fully set forth with reference to the accompanying drawings, in which—

Figure 1:
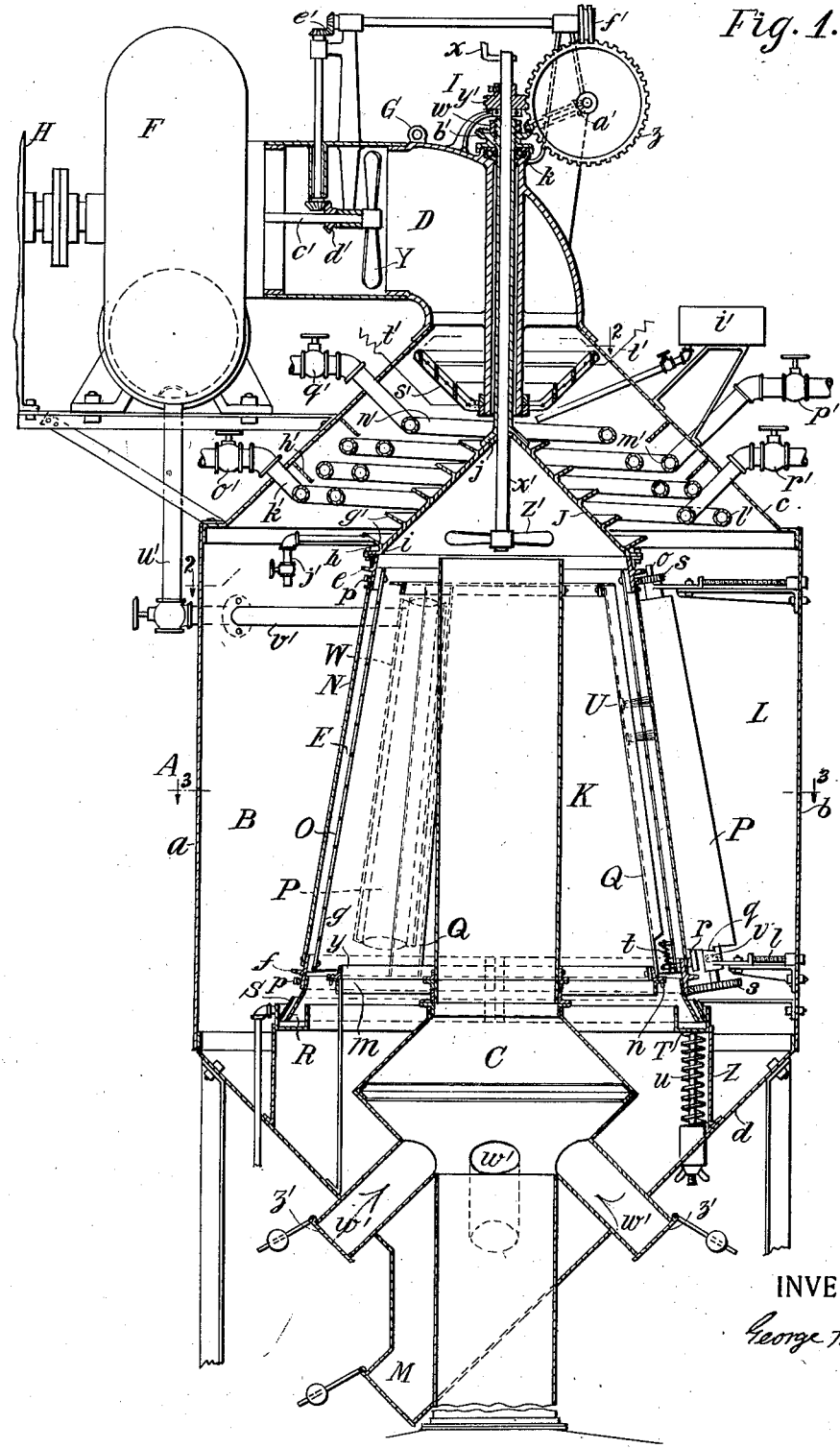
Fig. 1 is a side elevation, partly in vertical axial section, of a filtering apparatus provided with the preferred form of my present improvements.
Figure 2:
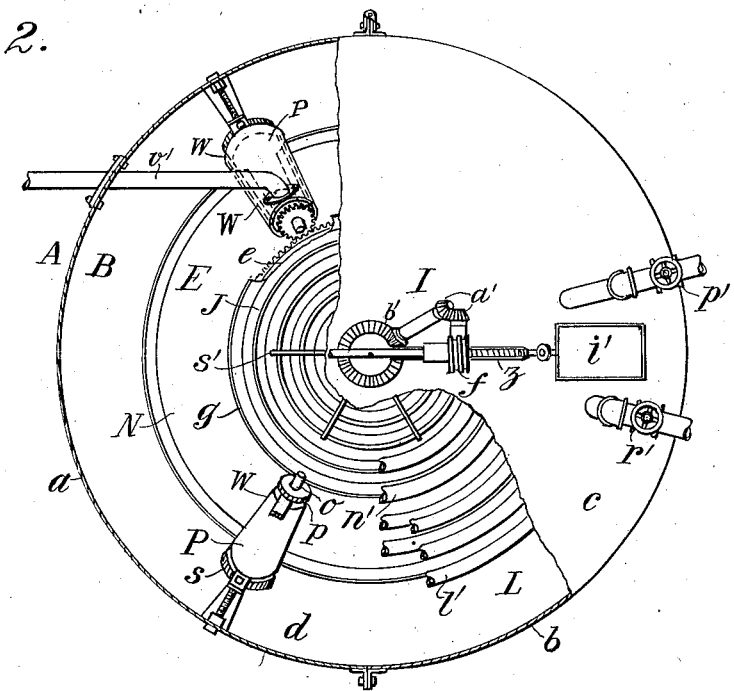
Fig. 2 is a fragmentary plan view thereof, partly in horizontal sections cut approximately on the planes of the line 2—2 in Fig. 1.
Figure 3:
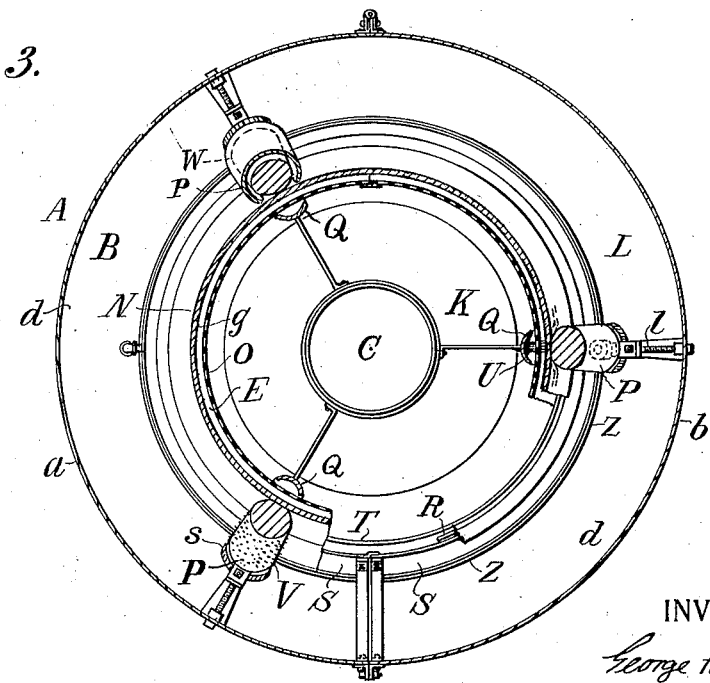
Fig. 3 is a fragmentary horizontal section thereof cut approximately on the plane of the line 3—3 of Fig. 1.

Referring to the drawings let A indicate an outer casing, B a fluid flow passage therein, C an inlet thereto, D an outlet therefrom, E a filter medium spaced within the casing A and extended across the passage B between the inlet C and the outlet D, F a blower for causing a current to flow through the passage B, Z' a current motor in the inlet, Y a current motor in the outlet, H a motor for driving the blower F, and I the drive gearing for driving the filter mechanism therefrom.

These parts may be of any usual or suitable construction for passing a particle laden current through an interstitial filter wall, for intercepting particles floating in the current.

The casing shown consists of a cylindrical body $a$, having a semi-cylindrical door $b$, surmounted by a truncated conical top $c$ around the outlet D, and having an inverted truncated conical bottom $d$ around the inlet C.

The filter medium E comprises a frame O, and an upstanding foraminous wall N, intersecting the passage B, having an open bottom around the inlet C, and a closed top wall J, and intersects communication between the inlet C and the outlet D, for intercepting particles floating from the inlet toward the outlet, and for dropping intercepted particles into a dust chamber K and passing cleaned fluid into an outer chamber L in communication with the outlet D, as is usual in such devices.

A partition Z separates the dust chamber K from the outer chamber L, and carries an annular trough T, within which the conical open end R of the filter medium E is movably disposed. The trough T carries a conical ring S around the end R, with which the latter may contact for resisting leakage under the end R. The trough T is depressible and is yieldingly supported by a spring $u$.

The inlet C has lateral branches $w'$ closed by gravity valves $z'$.

The bottom $d$ has a dust outlet M.

The top wall J is shown as conical, and as having a plurality of external ribs $g'$ for sustaining water supplied from a reservoir $i'$, and withdrawn by a drain pipe $j'$.

The top $c$ is shown as having internal ribs $h'$ spaced from the ribs $g'$, which ribs afford between them an upward passage for the cleaned air.

Pipe coils $l'$ and $n'$ are shown within the top $c$. The coil $l'$ is shown as connected by a pipe $m'$ with a supply valve $p'$, and by a pipe $k'$ with an exhaust valve $o'$. The coil $n'$ is shown as connected with a supply valve $q'$ and an exhaust valve $r'$.

A coil of wire $s'$, having terminals $t'$, is shown above the coil $n'$.

The filter wall N is shown as circular and carried by an upper ring $e$ and a lower ring $f$, which rings are spaced by a foraminous guard $g$, within and encircled by and adjacent the inlet side of the wall N. The top ring $e$ is separably carried from the lower flange $i$ of the inner top J, as by bolts $h$.

The top J is shown as carried by tubular shaft $j$ from a bearing $k$ above the outlet D.

The filter wall N and its top J are shown as rotatable about a vertical axis, and as rotated by the gearing I, which is shown as comprising a worm gear $z$, which is connected by a bevel pinion $a'$ with a bevel gear $b'$ on the tubular shaft $j$. The gear $z$ is shown as driven by a worm $f'$, which is rotated by pinions $d'$ and $e'$ from the shaft $c'$ of the blower F, on which shaft a current motor Y is shown as mounted in the outlet D.

The worm gear $z$ is preferably also rotated by a worm $y'$ on a shaft $x'$, depended through the tubular shaft $j$, and carrying a current motor Z', opposite and above the inlet C and operated by the current inflowing therethrough. The shaft $x'$ carries a handle $x$ by which it may be manually rotated when desired.

An eye-bolt G is provided on the outlet D, by which it may be lifted.

Cleaning means P are shown at the outlet side of the filter wall N, and cleaning means Q are shown at the inlet side of the latter. The cleaning means P are shown as rollers, carried on pintles $o$, rotated by pinions $s$, meshing in gears P, carried by the upper ring $e$ and the lower ring $f$ respectively.

According to one feature of my invention the cleaning means P and Q are each within the path of the fluid flow, and on opposite sides of the wall N, in close proximity thereto, and in opposed relation to each other, whereby a quiescent zone free from fluid flow is formed through the intercepted portion of the wall, in which separation of deposited particles from the wall is facilitated, and are extended throughout the height of the wall, whereby to extend said quiescent zone across and below said path, and the wall and cleaning means are movable the one relatively to the other, whereby each portion of the wall is successively subjected to said quiescent zone, for facilitating dislodgment of said particles therefrom, and their precipitation across the path of fluid flow without molestation from the current being filtered.

This is preferably accomplished by making the cleaner means Q as narrow semi-tubular or trough shaped deflectors, spaced longitudinally along the inlet side of the wall N, and each having a closed side opposed to and in the path of fluid flow, and an open side extending parallel and in close proximity to said wall throughout the height thereof, whereby to deflect said flow from the adjacent inlet side of the intercepted portion of the wall, and to form a quiescent zone free from fluid flow within the open side of the deflector, in which separation of deposited particles from the wall is facilitated, and by making the cleaner means P as distortion producing means contacting the outlet side of the filter wall N opposite each deflector Q and extended parallel thereto, whereby to distort the wall toward the hollow side of the deflector Q, and thereby to resist fluid flow through the distorted portion of the wall and to facilitate dislodgment of impurities therefrom so that they may fall into the relatively quiescent zone defined by the adjacent deflector Q.

According to another feature of improvement the distortion means P are adjustable relatively to the filter wall N, for varying distortion of the latter, for accomplishing which the roller P is shown as mounted on a ball bearing $v$ which is radially adjustable by a screw $l$, for varying the contact of the roller P with the wall N.

Three rollers P are preferably spaced around a circular wall N, and according to another feature of improvement the wall is preferably radially movable relatively to the rollers, so that by such movement it may equalize its position therebetween, for equalizing its distortion by each roller.

Preferably the wall N is conical, or has the shape of a frustum of a cone, and has an inclined under side as its inlet side, through which the fluid is adapted to flow in an upward direction, and from which particles deposited on the under side of the wall will tend to fall away from it as they are separated from it, and according to another feature of my invention as utilized with such a wall N, the cleaning means P and Q are inclined similarly to the inclination of the wall, and the rollers P are preferably tapered and the deflectors Q are inclined troughs, which enclose the quiescent zone within them, and have between their spaced edges inclined inner sides which slidably sustain particles separated from the inclined under side of the wall N and isolate them from the current flow, and inclinably slide them downwardly and outwardly through and below the latter.

In the conical assembly of the wall N and the cleaning means P and Q shown, one is preferably axially adjustable relatively to the other, for varying the relative proximity of the cleaning means and the wall, which is preferably accomplished by vertically adjusting the wall N by the nut $w$, screwed on the upper end of the tubular shaft $j$.

The lower end of the medium E is preferably loosely disposed in the trough T, so that it may move axially or radially therein for its adjustment relatively to the distortion rollers P, and it is spaced from the sealing ring S sufficiently to permit the desired amount of said adjustment.

Preferably, as shown, the deflectors Q carry brushes U which project through the large interstices in the guard $g$ and contact with the adjacent distorted portions of the wall N, for brushing particles therefrom.

Preferably the wall N is alternately stretched and released for vibrating it, preferably by drop cams $q$ on the lower end of a roller P, which ride on a roller $r$ carried by the ring $j$, and alternately depress and release the latter against the tension of a spring $t$, which is fastened to the guard $g$ and to the ring $j$.

According to another feature of improvement one or more of the rollers P is encircled by a semi-tubular deflector W at the outlet side of the wall N, which is preferably a conduit carried by a pipe $v'$, connected by a pipe $u'$ with the blower F, from the exhaust of which some current may flow into the conduit W at the outlet side of the wall N.

As shown, one or more of the rollers P is provided with pins V which contact with the wall N and penetrate the interstices thereof for opening these.

As shown, one side of the casing A is closed by a hand door $b$, by which one of the rollers P is carried, so that this roller may be moved out away from the wall N as the door is opened, and one half of the ring S is carried by this door, so that it may be removed therewith when the trough T is depressed sufficiently to clear it.

In the construction shown the deflectors Q are mounted on a ring $y$, mounted on a ring $m$, carried from the bottom $d$, and the ring $y$ is positioned on the ring $m$ by a pin $n$. In this construction the upper end of the inlet C is removable and is connected with the ring $y$, which, with the deflectors Q and the wall N, is horizontally removable through the door $b$ when the wall is disconnected from its top J and is released from the trough T by downward adjustment of the latter.

In operation, current to be filtered entering through the inlet C will flow outwardly and upwardly through and distend the portions of the wall N intermediate the rollers P, the deflectors Q will intercept current flow at longitudinally spaced narrow portions of the inlet side of the wall throughout the height of the latter, and thereby form between the deflectors Q and the wall N a quiet zone free from fluid flow, in which separation of deposited particles from the wall will be facilitated, the distortion means P, opposite the deflectors and at the outlet side of the wall, will distort the wall toward the hollow side of the deflectors, and thereby facilitate dislodgment from the inlet side of the wall of impurities, which will fall through the relatively quiescent zones defined by the deflectors, and as the filter wall and the cleaning means are moved, the one relatively to the other, each portion of the wall will be distorted successively by the distortion means toward the quiescent zone formed by the deflector means opposite the latter.

It will be understood that my invention is not limited to the particular details of construction, arrangement, or combination, of features, set forth as constituting its preferred form, since it can be availed of in whole or in part according to such modifications as circumstances, or the judgment of those skilled in the art, may dictate, without departing from the spirit of the invention.

What I claim is:

1. Fluid filter means comprising in combination, a casing defining a fluid flow passage and having inlet and outlet openings, a flexible, upstanding, interstitial, filtering wall within said casing across said passage, and means for cleaning said wall comprising tubular deflectors spaced longitudinally along the inlet side thereof each having an open side extending parallel and in close proximity to said wall throughout the height thereof, and a distortion producing means contacting the outlet side of said filter wall opposite each deflector and extending parallel thereto, said wall and cleaning means being movable relative to each other, whereby each portion of the wall is distorted successively by said means to facilitate dislodgment of impurities which fall through the relatively quiescent zones defined by said deflectors.

2. Fluid filtering means comprising in combination, a casing defining a fluid flow passage and having inlet and outlet openings, a flexible, upstanding, interstitial, filtering wall within said casing and across said passage, and means for cleaning said wall comprising a trough shaped deflector spaced longitudinally along the inlet side thereof and having an open side extended parallel and in close proximity to said wall throughout the height thereof, and a distortion producing means contacting the outlet side of said wall opposite said deflector and extended parallel thereto, said wall and cleaning means being the one movable relatively to the other, whereby each portion of the wall is distorted successively by said means to facilitate dislodgment of impurities which fall through the relatively quiescent zone defined by said deflector.

3. In the filter means specified in claim 2, said filter wall being circular and said distortion means being disposed concentrically thereof, and said wall and said distortion means being the one radially movable relatively to the other, whereby to vary said distortion.

4. In the filter means specified in claim 2, said distortion means being adjustable relatively to the outlet side of said filter wall, whereby to vary distortion of the latter.

5. Fluid filtering means comprising in combination, a casing defining a fluid flow passage and having inlet and outlet openings, a flexible, upstanding, foraminous, filtering wall within said casing and across said passage, and means for cleaning said wall comprising a narrow deflector spaced longitudinally along the inlet side thereof and having a side extended parallel to and in close proximity to said wall throughout the height thereof, and operable to form a quiescent zone free from fluid flow through the intercepted portion of said wall, in which separation of deposited particles from said wall is facilitated, and a distortion producer means in contact with the outlet side of said wall opposite and extended substantially parallel to said deflector and said quiescent zone, and operable to distort the outlet side of said wall opposite and toward said deflector and said quiescent zone, and thereby to facilitate said separation, said wall and said cleaning means being the one movable relatively to the other, whereby each portion of said wall is distorted successively by said cleaning means, to facilitate dislodgment of impurities which may fall through the relatively quiescent zone defined by said deflector.

6. Fluid filtering means comprising in combination, a casing defining a fluid flow passage and having inlet and outlet openings, a flexible, upstanding, foraminous, filtering wall within said casing and across said passage, and means for cleaning said wall comprising a narrow deflector spaced longitudinally along the inlet side thereof and having a side extended parallel to and in close proximity to said wall throughout the height thereof, and operable to form a quiescent zone free from fluid flow through the intercepted portion of said wall, in which separation of deposited particles from said wall is facilitated, and a rotatable distortion producer means, rotatable about an upstanding axis of substantially similar upward extension to said wall, in contact with the outlet side of said wall opposite to and extended substantially parallel to said deflector and said quiescent zone, and operable to distort the outlet side of said wall opposite and toward said deflector and said quiescent zone, and thereby to facilitate said separation, said wall and said cleaning means being the one movable relatively to the other, whereby each portion of said wall is distorted successively by said cleaning means to facilitate dislodgment of impurities which fall through the relatively quiescent zone defined by said deflector.

GEORGE HOLT FRASER.